US012776125B2

(12) United States Patent
Savvides et al.

(10) Patent No.: US 12,776,125 B2
(45) Date of Patent: Oct. 27, 2026

(54) SYSTEM AND METHOD FOR MULTIVIEW PRODUCT DETECTION AND RECOGNITION

(71) Applicant: CARNEGIE MELLON UNIVERSITY, Pittsburgh, PA (US)

(72) Inventors: Marios Savvides, Pittsburgh, PA (US); Magesh Kannan, Pittsburgh, PA (US); Uzair Ahmed, Pittsburgh, PA (US); Hao Chen, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 49 days.

(21) Appl. No.: 18/845,110

(22) PCT Filed: Apr. 3, 2023

(86) PCT No.: PCT/US2023/017293
§ 371 (c)(1),
(2) Date: Sep. 9, 2024

(87) PCT Pub. No.: WO2023/192666
PCT Pub. Date: Oct. 5, 2023

(65) Prior Publication Data

US 2025/0182444 A1 Jun. 5, 2025

Related U.S. Application Data

(60) Provisional application No. 63/326,337, filed on Apr. 1, 2022.

(51) Int. Cl.
*G06V 10/75* (2022.01)
*G06Q 20/20* (2012.01)
(Continued)

(52) U.S. Cl.
CPC ......... *G06V 10/751* (2022.01); *G06Q 20/208* (2013.01); *G06Q 20/209* (2013.01);
(Continued)

(58) Field of Classification Search
CPC ...... G06V 10/751; G06V 10/12; G06V 10/25; G06V 10/809; G06V 20/50; G06V 10/82; G06Q 20/208; G06Q 20/209; G06T 7/74
See application file for complete search history.

(56) References Cited

U.S. PATENT DOCUMENTS 11,869,032 B2 * 1/2024 Balasubramaniam ........................ G06N 3/0464
12,406,502 B2 * 9/2025 Wong .................. G06V 10/761
(Continued)

FOREIGN PATENT DOCUMENTS

WO 2023107599 A1 6/2023

OTHER PUBLICATIONS

Torralba et al., "Sharing Visual Features for Multiclass and Multiview Object Detection," In: IEEE Transactions on Pattern Analysis and Machine Intelligence, vol. 29, No. 5: 854-869 (2004).
(Continued)

*Primary Examiner* — Seung H Lee
(74) *Attorney, Agent, or Firm* — KDW FIRM PLLC

(57) ABSTRACT

Disclosed herein is a system and method for implementing object detection and identification, regardless of the orientation of the object. The product detection and recognition method and system disclosed herein comprises capturing views of each object from different angles from a plurality of cameras and fusing the result of a matching process to identify the object as one of a plurality of objects enrolled in an object database.

19 Claims, 8 Drawing Sheets

(51) Int. Cl.
*G06V 10/12* (2022.01)
*G06V 10/25* (2022.01)
*G06V 10/80* (2022.01)
*G06V 20/50* (2022.01)

(52) U.S. Cl.
CPC .............. *G06V 10/12* (2022.01); *G06V 10/25* (2022.01); *G06V 10/809* (2022.01); *G06V 20/50* (2022.01)

(56) References Cited

U.S. PATENT DOCUMENTS

| | | | |
|---|---|---|---|
| 2006/0088207 | A1 | 4/2006 | Schneiderman |
| 2013/0016877 | A1 | 1/2013 | Feris et al. |
| 2013/0223673 | A1 | 8/2013 | Davis et al. |
| 2013/0243250 | A1 | 9/2013 | Weisenburger et al. |
| 2018/0012082 | A1 | 1/2018 | Satazoda et al. |
| 2019/0108396 | A1 * | 4/2019 | Dal Mutto ............. G06N 3/047 |

OTHER PUBLICATIONS

International Search Report and Written Opinion of the International Searching Authority for International Application No. PCT/US2023/017293, mailed Jul. 3, 2023, 16 pages.

* cited by examiner

600

SYSTEM AND METHOD FOR MULTIVIEW PRODUCT DETECTION AND RECOGNITION

RELATED APPLICATIONS

This application is a national phase filing under 35 U.S.C. § 371 claiming the benefit of and priority to International Patent Application No. PCT/US23/17293, filed Apr. 3, 2023, entitled "SYSTEM AND METHOD FOR MULTIVIEW PRODUCT DETECTION AND RECOGNITION", which claims the benefit of U.S. Provisional Patent Application No. 63/326,337, filed Apr. 1, 2022, the contents of which are incorporated herein in their entireties.

BACKGROUND

In many settings, it is desirable to be able to accurately detect and identify objects in a scene. For example, in a retail setting, products may be detected and identified as they are placed on a checkout counter to enable an automatic checkout process. However, it is indeterminate as to how objects may be oriented within the scene. For example, in the retail setting, a customer may place products on a checkout counter at random angles and orientations and may even stack one product on another.

In a system that relies on image capture from a camera to detect and identify objects, having an object poorly-oriented with respect to the camera, or wholly or partially covered by another object, increases the difficulty of identifying the object, may lead to a mis-identification of the object, or make it impossible to identify the object.

For example, in a grocery store setting, the rear surfaces of many different products look alike, typically comprising a label bearing nutritional and ingredient information. In such a setting, if the customer were to place an object such that the rear surface of the object is oriented to the camera, detection of the object may be possible, but identification of the object may not be possible because the rear surface of the object may lack sufficient characteristics to differentiate it from the rear surfaces of other known objects.

The chances of an accurate identification of an object in a scene may be improved by requiring that the objects be oriented in a specific way with respect to the camera. However, in a retail setting, and in many other settings, it is likely not practical to require that the customer place each object such that it is optimally or nearly-optimally oriented for detection and identification from a captured image. Therefore, it would be desirable to provide a system and method capable of improving the chances of accurate detection and identification of objects from a captured image, regardless of the orientation of the objects.

SUMMARY

To address the issues identified above, disclosed herein is a system and method implementing object detection and identification, regardless of the orientation of the object. The product detection and recognition method and system disclosed herein comprises a plurality of cameras capturing views of each object from different angles.

In one embodiment, the system first detects one or more objects from images captured from the plurality of cameras, extracts product feature vectors from the detected objects, matches the extracted feature vectors with a database of enrolled product feature vectors for product identification for each angle, and performs a fusion of the matching results based on confidence scores from the matching of the object from the images provided by each camera with objects in the database.

In a second embodiment, different detected objects are fused to achieve an optimized object detection result. The features extracted from the fused views are then fused at the feature vector level to achieve optimized feature extraction result.

For each embodiment, the optimized matching result for the product is providing as the final matched product.

In a variation of the embodiments, the object detection uses one or more or semantic segmentation, background subtraction and color segmentation to isolate and detect the objects in the images.

BRIEF DESCRIPTION OF THE DRAWINGS

By way of example, a specific exemplary embodiment of the disclosed system and method will now be described, with reference to the accompanying drawings, in which.

DETAILED DESCRIPTION

The claimed embodiments are directed to a system and method for detecting and identifying objects using multiple cameras to provide multiple views of the objects from different viewpoints. Because objects in a scene may be oriented at non-optimal angles with respect to a single camera, using multiple cameras and fusing the results provides a high higher probability of an accurate identification of the objects.

The claimed embodiments will be explained in the context of a checkout at a retail grocery store, wherein the customers pick objects from their cart and place them on a checkout counter. As would be realized, however, the system and method have application in many other contexts in which it is desired to detect and identify objects. These may include, as a few examples, warehouses (e.g., wherein products are picked from shelves, either manually or robotically), hospital settings (e.g., operating rooms), manufacturing facilities and banks. In addition, the claimed embodiments may be used to identify people, for example, to control access to a facility or for any other purpose. Many other applications are contemplated and are intended to be within the scope of the invention.

Figure 1:
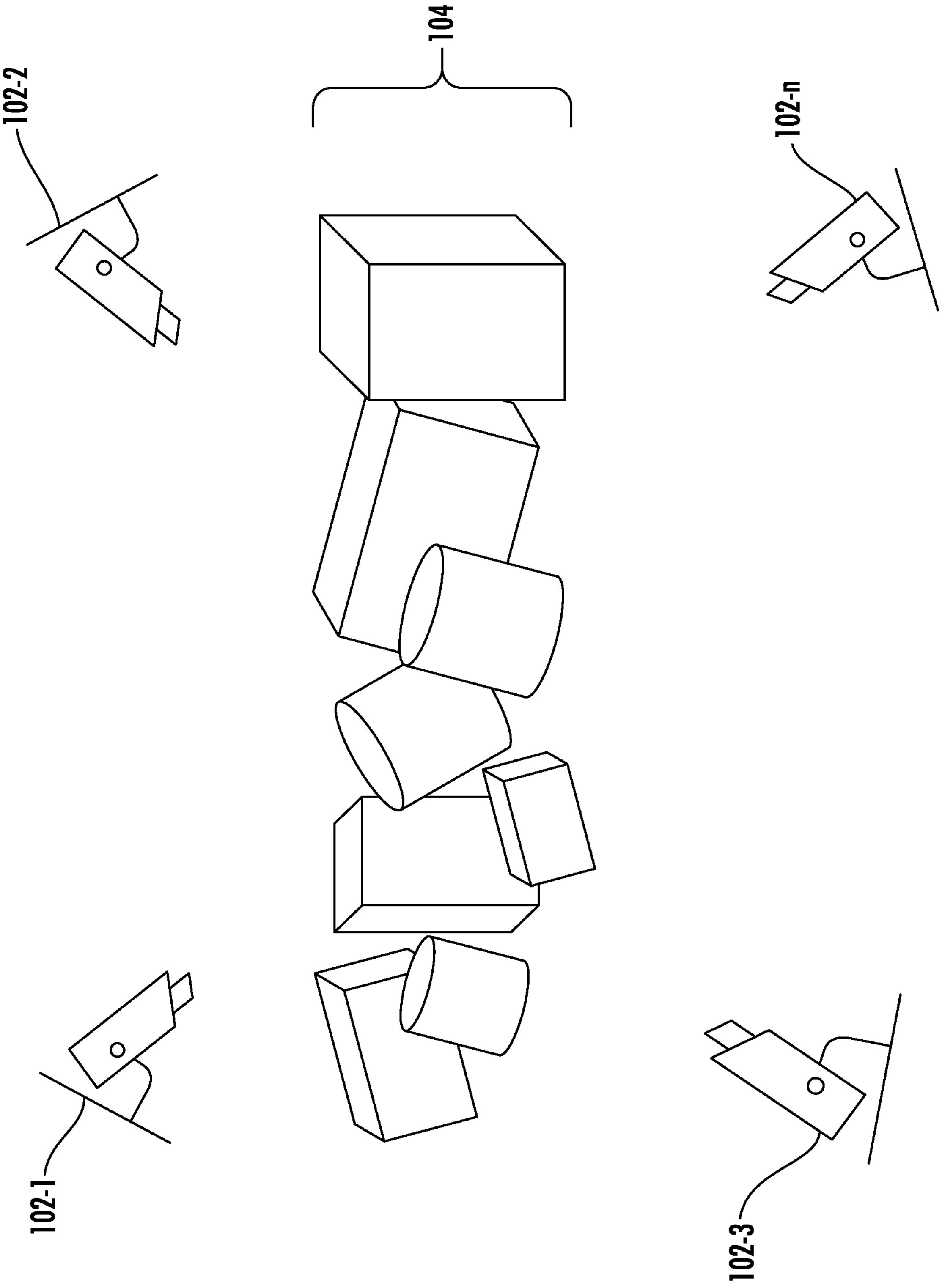
FIG. 1 is an illustration of an exemplary scene showing multiple objects to be detected and an exemplary embodiment of the system using 4 cameras.

An exemplary context is shown in FIG. 1, which shows grocery items 104 packaged in containers of various sizes and shapes, although it is not necessary that the items be packaged, as would be the case, for example, for produce. The objects may be disposed on a countertop for checkout or may be in a grocery cart. Multiple cameras 102-1 . . . 102-*n* (hereinafter collectively referred to as "cameras 102") are trained on an area of interest, in this case, the countertop checkout. As would be realized by one of skill in the art, the claimed embodiments are contemplated to use any number of cameras 102 and are not limited to the use of 4 cameras as shown in FIG. 1. In various embodiments, the objects 104 may be stationary or may be in motion, as would be the case wherein the countertop checkout uses a conveyor, or wherein people are being identified as they walk.

In various embodiments, cameras 102 may be single image cameras or video cameras, although any means of collecting an image are contemplated to be withing the scope of the invention. Therefore, any use of the term "camera" herein is not intended to be limited in any way as to the type of images gathered or the means of gathering the images.

Further, the collected images are not meant to be limited to optically-observable images in the traditional sense. (i.e., the images need not be in the visible area of the spectrum). For example, the images may consist of infrared or ultraviolet images and images collected in other areas of the spectrum, for example, radio waves, microwaves, X-Rays, etc. Any "images" from which features may be extracted are contemplated to be within the scope of the claimed embodiments.

Figure 2:
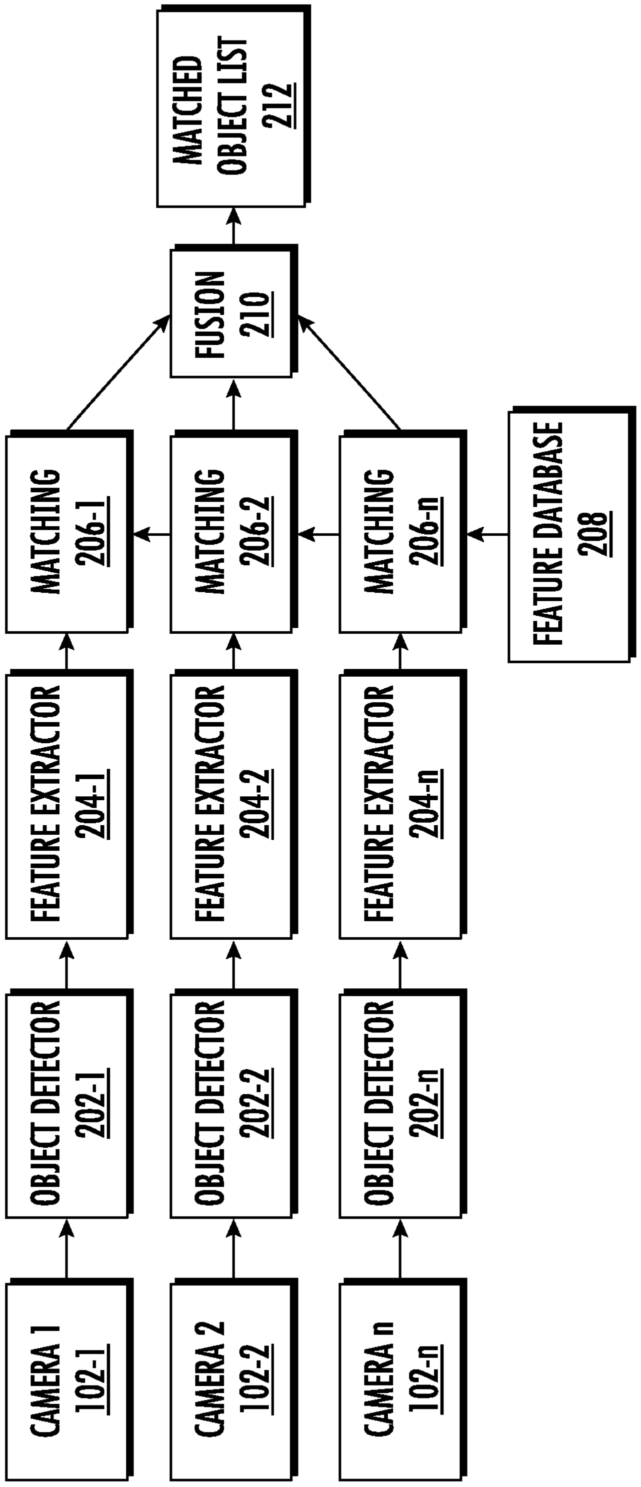
FIG. 2 is a block diagram of a first embodiment of the system in which the matching results from each camera are fused.

In a first embodiment of the system, shown in FIG. 2, images from each camera 102 are processed in a separate processing stream. The images are first input to an object detector 202. Object detector 202 may be any known or later developed means for detecting objects in an image and the claimed embodiments are not meant to be limited to a specific object detector 202.

Object detector 202 typically will comprise a localization sub-network that feeds downstream tasks, such as feature extraction and matching. Most downstream tasks require that the localization sub-network provide a bounding area for each object, for example, products in a retail setting. Therefore, for scene understanding in 2D images, in one embodiment, the objects are represented by 2D bounding boxes. It is crucial to ensure that the bounding boxes are well aligned with the detected objects to provide accurate information about the products for the downstream tasks. The bounding box is expected to cover the most representative pixels and accurately locate the product while concurrently excluding as much noisy context, as possible, such as background.

In exemplary embodiments, object detector 202 could be, for example, an open source detector, a trained neural network, or a quadrilateral detector of the type disclosed in PCT Patent Application No. PCT/US2022/052219, entitled "System and Method for Assigning Complex Concave Polygons as Bounding Boxes". In various embodiments, object detector 202 may produce axis-aligned bounding boxes, rotated bounding boxes or complex concave polygon bounding boxes (e.g., quadrilateral bounding boxes) as specified in the cited PCT application. In one embodiment, product detector 202 may apply semantic segmentation to produce outlines of the objects as opposed to bounding boxes. This may be especially important in cases wherein the objects are overlapping or stacked on one another, in which a bounding box is likely to encompass multiple objects, whereas semantic segmentation may be able to differentiate between the overlapping or stacked objects.

The objects detected by object detectors 202 in each processing stream are then input to a feature extractor 204 which will produce a feature vector representative of the object. Feature extractor 204 may be any type of trained neural network or machine learning model which has been trained on the types of objects of interest. Again, the claimed embodiments are not intended to be limited to implementations using any specific type of feature extractor. In some embodiments, the extracted features may be encrypted or disguised by adding latent dimensions to prevent reverse engineering of the system.

The extracted feature vectors from each processing stream are then matched with a database 208 of enrolled feature vectors extracted from multiple views of all objects in the domain. For example, in the context of a retail grocery store, the domain of objects would be all products sold by the store. The matching process 206 may produce a proposed matched object, with a confidence score. In one embodiment, the matching process 206 may calculate a cosine similarity between the feature vectors extracted by each processing stream and feature vectors of objects enrolled in database 208. In other embodiments, any means of comparing the feature vectors may be used. The matched object from database 208 for each feature vector may be the object having the closest cosine similarity between the extracted feature vectors and the feature vectors of the enrolled objects. A confidence score for each processing stream may be assigned for each processing stream based on the cosine similarity or other method of comparison. In other embodiments, any other method of matching to produce a likely match and confidence score may be used.

The results of the matching process 206, namely, the confidence scores, are then fused 210 together to determine an overall probability of match between the object in the image and the object in the database 208. The fused score may be a weighted score based on a weighting of the individual confidence scores from each processing stream. In one embodiment, the confidence scores may be weighted based on a determination of the angle of the object with respect to the camera, wherein higher angle poses are given less weight than more straight-on poses of the objects.

In another embodiment, confidence scores showing a rear face of the object may be given less weight than poses showing a front face of an object. In yet another embodiment in which a receipt is available, confidence scores may be weighted based on the contents of the receipt, with matches with objects listed on the receipt receiving a higher confidence level.

Confidence scores may also be weighted based on a temporal component. In embodiments wherein the objects are moving, for example, having been placed on the conveyor at a checkout counter, confidence scores from views of the object at certain times may receive a higher weight than views of the object at other times. For example, a cleaner view of the object may be available immediately after the object is placed on the conveyor (or while the object is being placed on the conveyor), as opposed to a view of the object at a later time when the object may become obscured by other objects. Likewise, as the object moves its position changes with respect to the cameras and a later position of the object may offer a better view to one or more of the cameras than earlier positions.

Any combination of differing means of weighting the confidence scores from each processing stream may be used to determine an overall probability of a match.

If the overall (fused) probability of a match is high enough, for example, over a predetermined threshold, then the product may be added to the list of matched products 212. It should be noted that it is likely that more than one product may be detected in an image, and that the list of matched products 212 may list a match for each detected object. Also note that in some instances, each camera 102 may not be able to capture an image of each object (e.g., one object may obscure another object from a particular camera) and, as such, the number of feature vectors available for matching for a particular product may be less than the number of cameras 102 available in the system.

Figure 3:
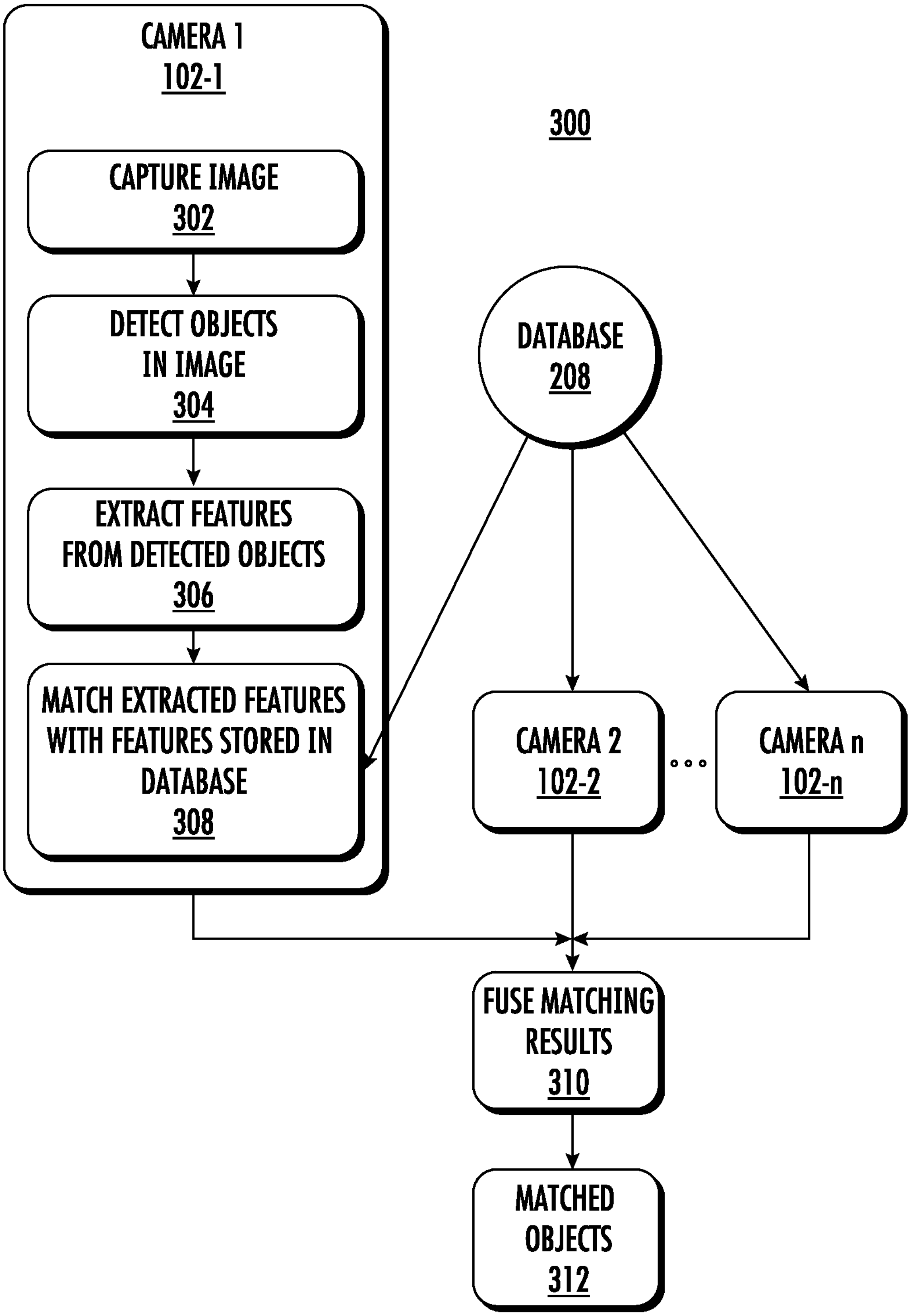
FIG. 3 is a flow chart showing a method embodying the process depicted by the block diagram of FIG. 2.

FIG. 3 is a flowchart showing a method 300 of the first embodiment of the invention. The steps of the processing stream from camera 102-1 are shown while the processing streams for cameras 102-2 . . . **102-*n* have been collapsed into a single block for simplicity. It should be noted, however, that the processing streams for each of cameras 102-1 . . . 102-*n*** are substantially identical.

At step 302 an image is captured by camera 102. At step 304, objects are detected in the image using object detectors 202. As previously stated, the objects may be delineated by outlines or bounding boxes. At step 306, features are extracted from the detected objects using a trained feature extractor and, at step 308 the extracted feature vectors are matched with feature vectors of products enrolled in database 208. The output of each processing stream is a matched object and a confidence score indicating the confidence that the matched object matches the actual object detected in the image. At step 310 the confidence scores are fused together using methods previously discussed to produce a probability of a match and, at step 312, objects that have a high probability of having been correctly identified are added to the matched objects list 212, based on the probability of a match.

Figure 4:
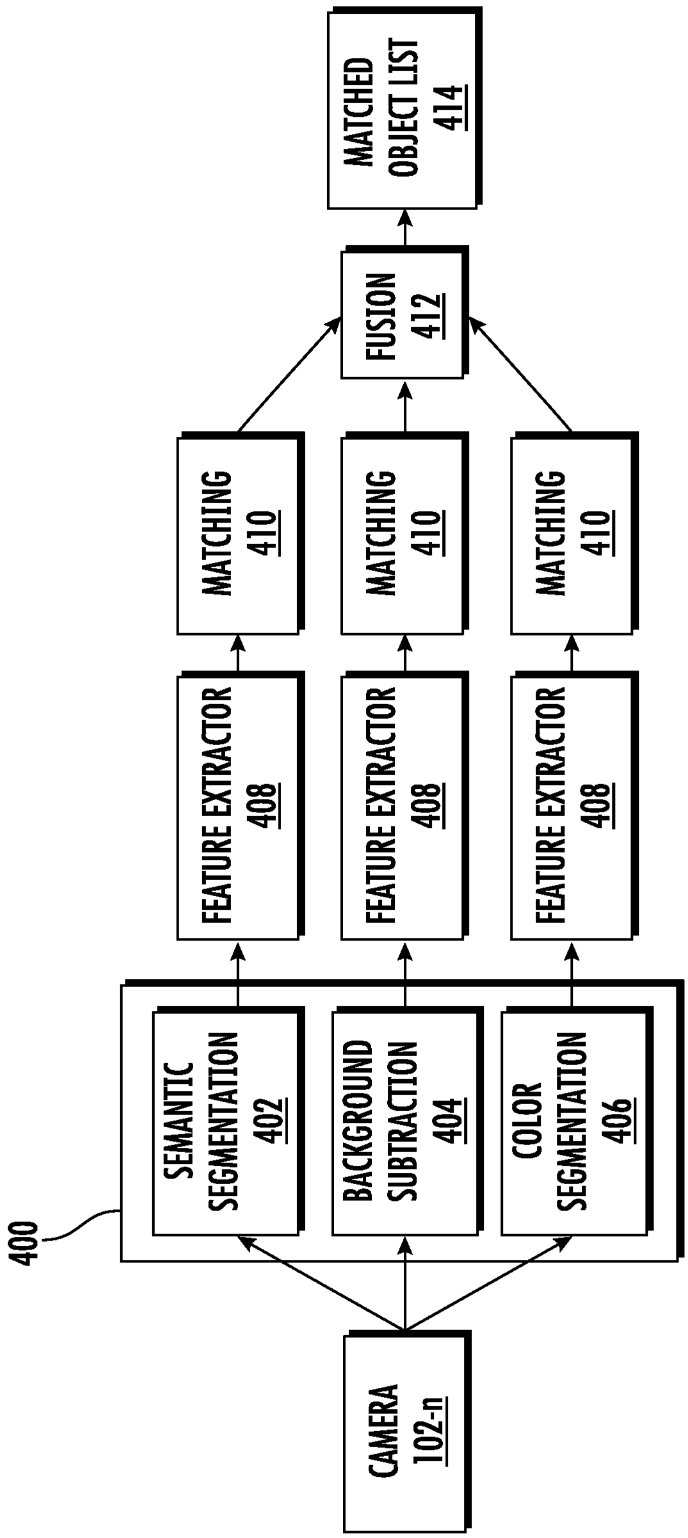
FIG. 4 is a block diagram of a variation of the various embodiments of the system in which product detection in captured images comprises isolating the objects using semantic segmentation, background subtraction and/or color segmentation.

FIG. 4 shows a variation of the embodiments of the system wherein the object detectors 202-1 . . . **202-*n* shown in FIG. 2 are replaced, for each of the cameras, by box 400 in FIG. 4. Box 400 shows three possible pipelines for performing object detection, that is, isolating objects in the images captured by one of cameras 102**.

Figure 5:
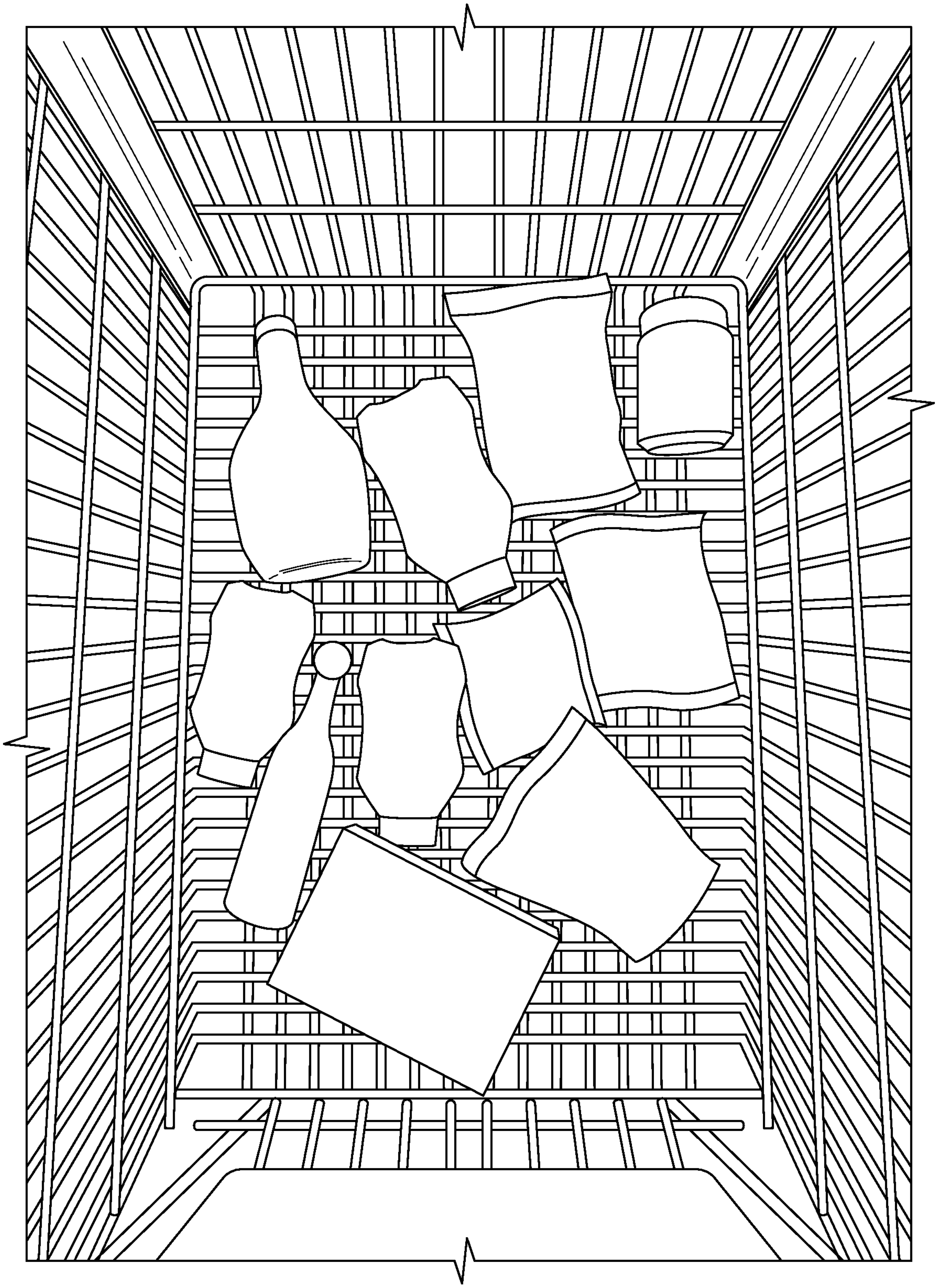
FIG. 5 depicts multiple objects isolated in a scene of multiple objects by outlining of the objects.

In box 402 a semantic segmentation is performed on the images, in which a label or category is associated with each pixel in the image to recognize the collection of pixels that form distinct categories, in this case, the objects. Based on the semantic segmentation, an outline of each object in the image is produced, as shown in FIG. 5. Semantic segmentation 402 can be implemented by a trained neural network of any configuration. Methods for performing semantic segmentation are well known in the art, and any known method may be used.

In box 404, a background subtraction may be performed between a later image and an earlier image. The earlier image, which may include other objects, becomes background and the later image, having a new object shown therein, becomes the foreground. Subtracting the background image from foreground image isolates the new object.

In box 406, color segmentation is performed, in which the color feature of each pixel in the image is compared with the color features of surrounding pixels to isolate the objects. The color segmentation may be performed by any known method, including, for example, a trained color classifier to segment the image.

For each of the object isolation pipelines 402, 404, 406, a feature extractor 408 extracts features from the isolated objects and the extracted feature vectors are matched at 410 with feature vectors enrolled in feature database 208. The confidence scores produced by the matching process 410 are then fused at 412 to produce a matched object list 414 for a particular camera **102-*n*. The feature extractors 408, matching 410 and fusion 412 may be substantially identical to feature extractor 204, matching 206 and fusion 210 in FIG. 2 as discussed with respect to the first embodiment. Once fusion 412 occurs, the results may be fused with results from other cameras 102**.

It should be noted that the block diagram in FIG. 4 shows processing pipelines 402, 404 and 406 for a single camera and that the each of cameras 102-1 . . . **102-*n* is provided with its own set of processing pipelines 402, 404 and 406. In some embodiments, each camera may optionally be provided with any combination of the object isolation pipelines 402, 404 and 406. Further, feature extractors 408 may be identical or may be trained to operate with a specific pipeline 402, 404 or 406**.

Figure 6:
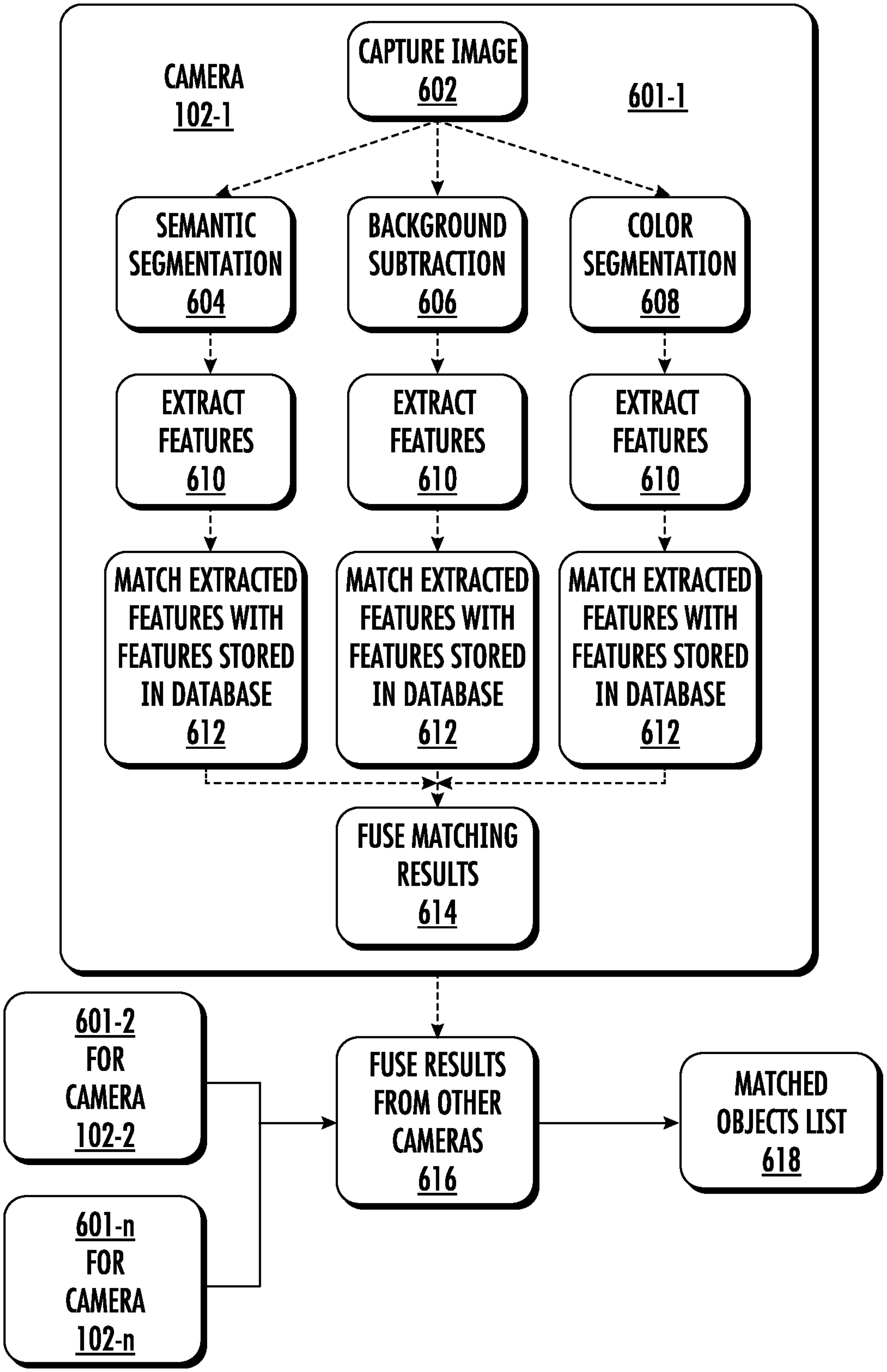
FIG. 6 is a flow chart showing a method embodying the process depicted by the block diagram of FIG. 4.

FIG. 6 is a flowchart showing the process of FIG. 4. Box 601-1 shows the processing pipelines for a single camera 102-1. At step 602, images are captured by the camera. The captured image may be exposed to some or all of processing pipelines 604, 606, 608 which perform semantic segmentation, background subtraction and color segmentation respectively. Other means of isolating objects may also be used in separate processing pipelines and are contemplated to be within the scope of the invention. At step 610, features are extracted from the isolated objects for each of the pipelines 604, 606 and/or 608. At step 612, the feature vectors extracted in step 610 are matched with feature vectors stored in feature database 208 and confidence scores are produced, as previously discussed. The confidence scores are fused into an overall probability of a match at step 614. At step 616, the matching results of processing pipelines 601-2 . . . **601-*n* from other cameras 102-2 . . . 102-*n* are fused as previously discussed and objects which have been positively identified are added to the matched objects list 618**.

Figure 7:
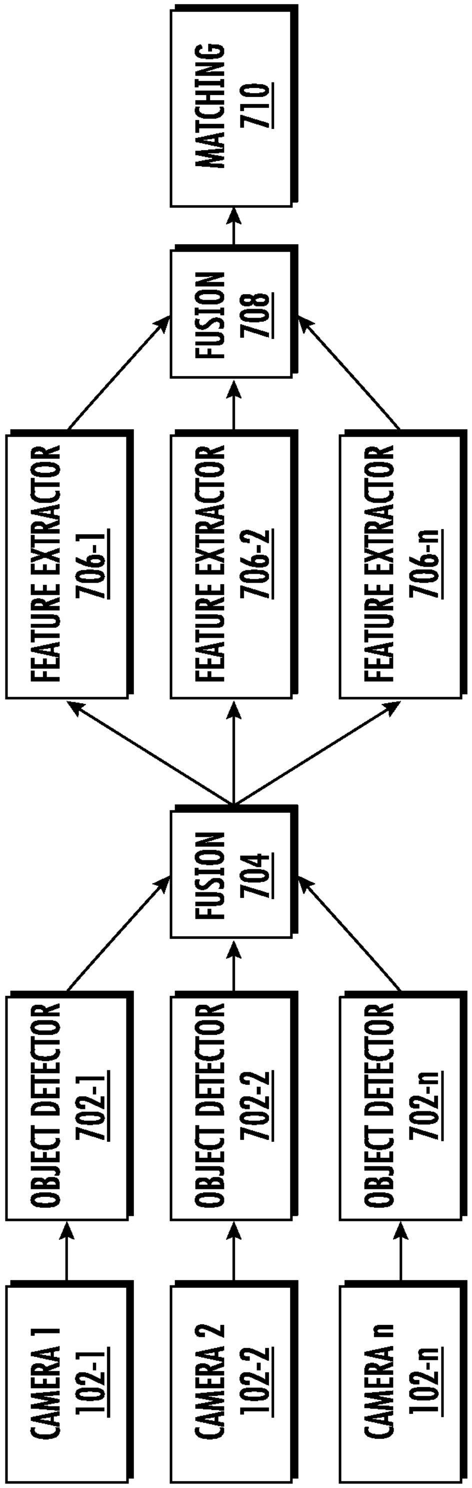
FIG. 7 is a block diagram of another embodiment of the system in which objects detected in multiple images are first fused, features are then extracted and fused and matching is accomplished using the fused features.

FIG. 7 shows a second embodiment of the invention in which a fusion 704 occurs after the object detection 702. Object detector 702 detects objects in images captured by cameras 102. Object detector 702 may be identical to object detector 202 shown in FIG. 2 or may utilize the processing pipelines 400 shown in FIG. 4. An input to fusion 704 will therefore be either a bounding box containing the object or an outline of the object. Fusion 704 fuses the views of each object from each of cameras 102. In one embodiment, fusion 704 may collect different views of the object from each of cameras 102 and produce a 3D model of the object. In some embodiments, a transformation may be performed to translate an angle view of an object in one camera frame to another camera frame. The purpose of fusion 704 is produce one or more optimized views of the object for purposes of feature extraction. It should be noted that fusion 704 may produce multiple views of the object. In step 706, multiple feature extractors 706 extract features from each of the multiple views produced by fusion 704. The extracted feature vectors are then fused at fusion 708 by simple mathematical calculation, for example, by addition, averaging, concatenation, etc. The fused features are then matched 710 as discussed with previous embodiments. In an alternate embodiment, fusion 708 could be skipped and the matching 710 could be performed on features vectors extracted by each of feature extractors 706.

Figure 8:
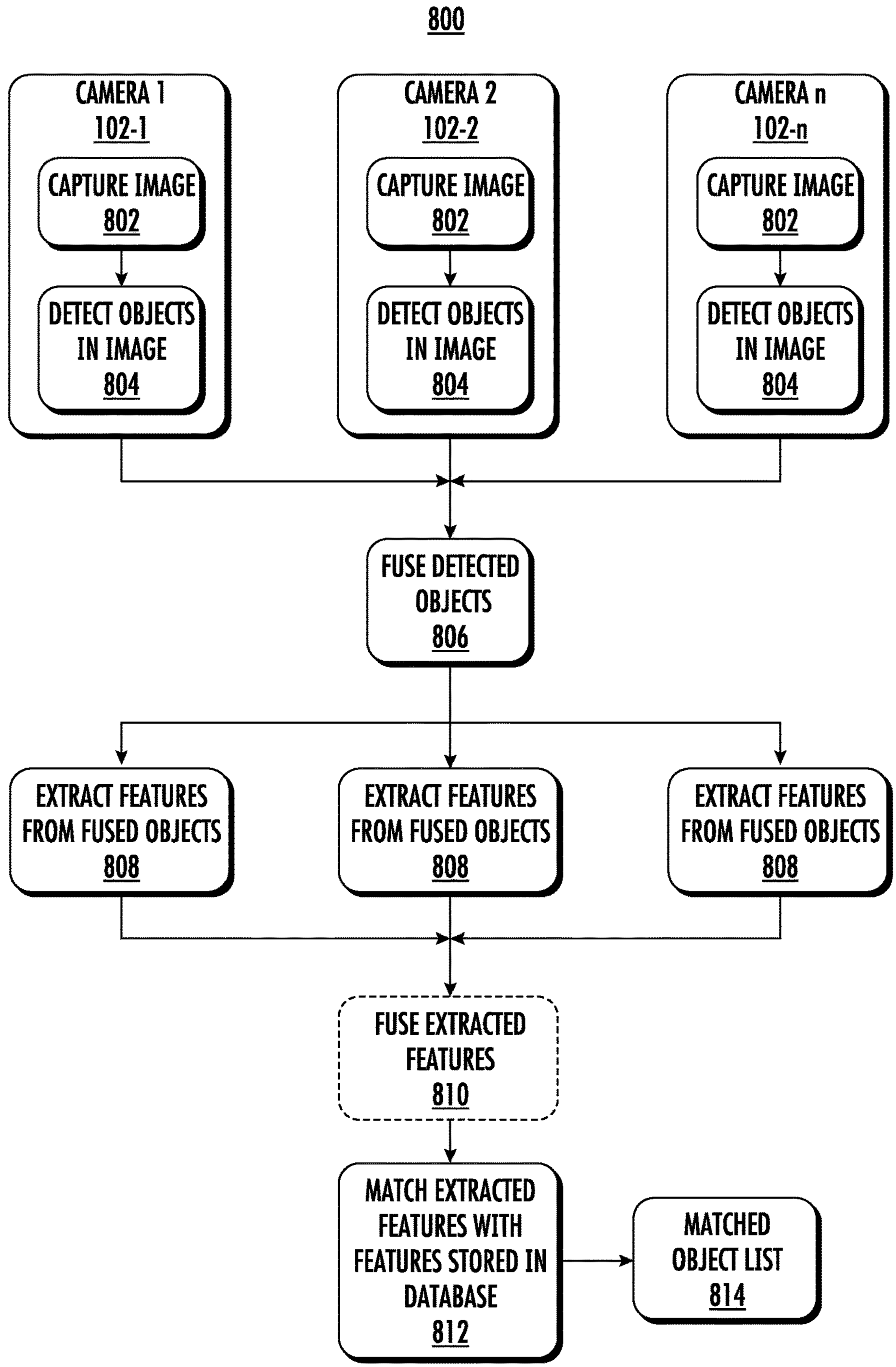
FIG. 8 is a flow chart showing a method embodying the process depicted by the block diagram of FIG. 7.

FIG. 8 is a flowchart showing the process of FIG. 7. For each of cameras 102, an image is captured at 802 and objects are detected in the image at 804. As previously mentioned, the object detector may be object detector 202 shown in FIG. 2 or may be the processing pipelines 400 shown in FIG. 4. At step 806, the detected objects are fused to produce one or more optimized views of the object. At step 808 feature vectors are extracted from the one or more optimized views of the object and at step 810 the extracted features are optionally fused together. At step 812, matching occurs using either the fused feature vectors or the individual feature vectors produced by feature extractors 706. A matched object list is produced at 814.

As previously discussed, there may be a temporal aspect to the disclosed embodiments in which an image of each product is captured by camera 102 as it is being placed on the counter or immediately thereafter. In one embodiment, the object may be imaged as a person moves the object into view of the cameras 102 and detector 202, 400 or 702 may be used to track the hand in the object and match the object as the object is being placed on the counter.

In another aspect of each of the disclosed embodiments, metadata may be present in the features database 208 and may be used to increase the confidence of a match. The metadata may include, for example, weight and size information associated with each of the objects in the database. Because many checkout counters and other settings contain scales for determining the weight of objects placed on the counter, the weight of an object may be determined as the object is placed on the counter by taking a difference in the weight registered by the scale before and after the object is placed. The weight of the object may be then used to confirm a match by determining if the weight of the object matches the weight contained in the metadata for the object in the features database which matched the object in the images. Likewise, the size of the object could be estimated from the views of the object captured by cameras 102 and the size compared to an expected size for the object as stored in the metadata to increase the probability of a match.

The methods disclosed herein may be embodied as software stored on a non-transitory, computer-readable media and executed by a processor to instantiate the method. A system implementing the methods may comprise a processor having both transitory and non-transitory memory and software, permanently stored on the non-transitory medium and loaded into the transitory medium for execution by the processor. The system may further comprise the cameras 102 for collection of the images and one or more input/output devices, for example, keyboard and a display for displaying the results.

As would be realized by one of skill in the art, many variations on the implementations discussed herein fall within the intended scope of the invention. Moreover, it is to be understood that the features of the various embodiments described herein are not mutually exclusive and can exist in various combinations and permutations, even if such combinations or permutations were not made express herein, without departing from the spirit and scope of the invention. Accordingly, the method and system disclosed herein are not to be taken as limitations on the invention but as an illustration thereof. The scope of the invention is defined by the claims which follow.

The invention claimed is:

1. A method for detection and identification of objects comprising:

capturing a plurality of views of one or more objects from multiple cameras;

detecting the one or more objects in the images using an object detector;

extracting features from the one or more detected objects;

matching the extracted features from the images with features of objects enrolled in a database; and fusing results of the matching to identify an object in the images as an object enrolled in the database;

wherein the one or more objects are detected and placed within complex concave polygon bounding boxes by the object detector.

2. The method of claim 1 wherein objects are detected in images from each of the plurality of cameras.

3. The method of claim 2 wherein the one or more objects are detected by one or more of semantic segmentation, background subtraction and color segmentation for each of the plurality of cameras.

4. The method of claim 3 wherein extracted features from each of the semantic segmentation, background subtraction and color segmentation for each of the plurality of cameras camera are used to match with features in a database of enrolled objects.

5. The method of claim 4 wherein matches based on each of the semantic segmentation, background subtraction and color segmentation are fused together to create a match for each of the plurality of cameras.

6. The method of claim 5 wherein the matches from each of the plurality of cameras are fused together to create a final match to an object in the image.

7. The method of claim 1 wherein the features are extracted from the detected objects from each of the plurality of cameras.

8. The method of claim 7 wherein the extracted features from each camera are used to match with features of objects in the database.

9. The method of claim 7 wherein the matches comprise an object identified in the database and a confidence score that the features associated with the object in identified in the database match the features extracted from the detected objects.

10. The method wherein the database contains metadata regarding the objects in the database.

11. The method of claim 10 wherein the metadata includes the weight and size of the one or more objects.

12. The method of claim 10 wherein the metadata is used to improve the probability of a match between the one or more objects detected in the image and an object enrolled in the database.

13. A method for detection and identification of objects comprising:

capturing a plurality of views of one or more objects from multiple cameras;

detecting the one or more objects in the images using an object detector;

extracting features from the one or more detected objects;

obtaining a weighted confidence score that the extracted features from the images match with features of an object enrolled in a database; and fusing the weighted confidence scores to identify an object in the images as an object enrolled in the database;

wherein the confidence scores are weighted based on a determination of an angle of an object in an image with respect to the camera used to capture the image.

14. A method for detection and identification of objects comprising:

capturing a plurality of views of one or more objects from multiple cameras;

detecting the one or more objects in the images using an object detector;

extracting features from the one or more detected objects;

obtaining a weighted confidence score that the extracted features from the images match with features of an object enrolled in a database; and fusing the weighted confidence scores to identify an object in the images as an object enrolled in the database;

wherein confidence scores are weighted based on which side of the object is facing the camera.

15. A method for detection and identification of objects comprising:

capturing a plurality of views of one or more objects from multiple cameras;

detecting the one or more objects in the images using an object detector;

extracting features from the one or more detected objects;

obtaining a weighted confidence score that the extracted features from the images match with features of an object enrolled in a database; and fusing the weighted confidence scores to identify an object in the images as an object enrolled in the database;

wherein the confidence scores are weighted based on a temporal component wherein images of the object at certain times may be weighted more heavily than images of the object at other times.

16. A method for detection and identification of objects comprising:

capturing a plurality of views of one or more objects from multiple cameras;

detecting the one or more objects in the images using an object detector;

extracting features from the one or more detected objects;

obtaining a weighted confidence score that the extracted features from the images match with features of an object enrolled in a database; and fusing the weighted confidence scores to identify an object in the images as an object enrolled in the database;

wherein the confidence scores are weighted based on a match between objects listed on a receipt and objects identified in the database.

17. A method for detection and identification of objects comprising:

capturing a plurality of views of one or more objects from multiple cameras;

detecting the one or more objects in the images using an object detector;

fusing the one or more objects detected in images from each camera to create one or more optimal views of the objects;

extracting features from each of the one or more optimal views of the objects;

fusing features extracted from each of the one or more optimal views of the objects; and matching the fused features with objects in the database.

18. A method for detection and identification of objects comprising:

capturing a plurality of views of one or more objects from multiple cameras;

detecting the one or more objects in the images using an object detector;

extracting features from the one or more detected objects;

matching the extracted features from the images with features of objects enrolled in a database; and fusing results of the matching to identify an object in the images as an object enrolled in the database;

wherein the objects are products in a retail setting and further wherein the objects are detected as they are placed on or after they are placed on a checkout counter; and wherein the probability of a match is increased when matching products identified in the database match objects listed on a receipt from a retail checkout.

19. A system comprising:

a plurality of cameras positioned to collect still or video imagery from different angles of a scene;

a processor coupled to the one or more cameras such as to be able to collect the still or video imagery from each of the cameras; and software that, when executed by the processor, cause the system to:

capture a plurality of views of one or more objects from the plurality of cameras;

detect one or more objects in the images using an object detector;

extract features from the one or more detected objects;

match the extracted features from the images with features of objects enrolled in a database; and fuse results of the matching to identify an object in the images as an object enrolled in the database;

wherein the one or more objects are detected and placed within complex concave polygon bounding boxes by the object detector.

* * * * *